Aug. 7, 1928.
H. L. PARKER
1,679,490
CABLE PULLING DEVICE
Filed Dec. 18, 1926
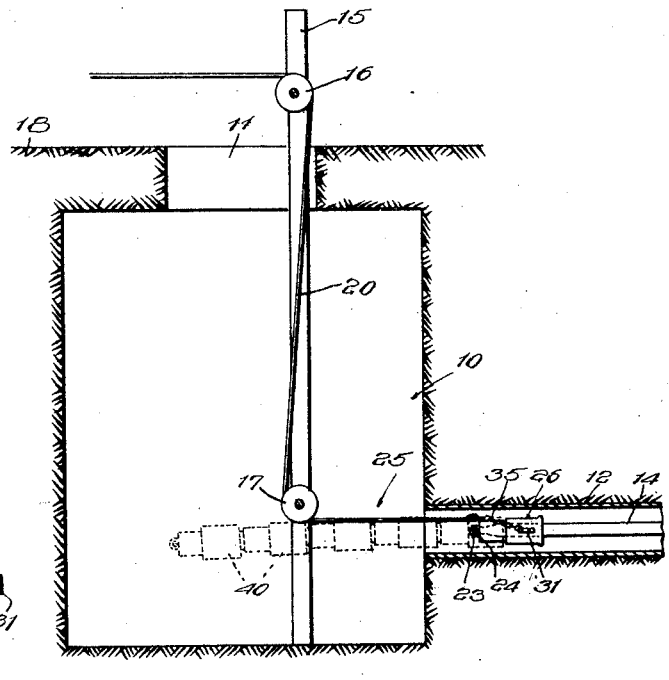
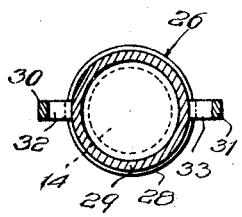
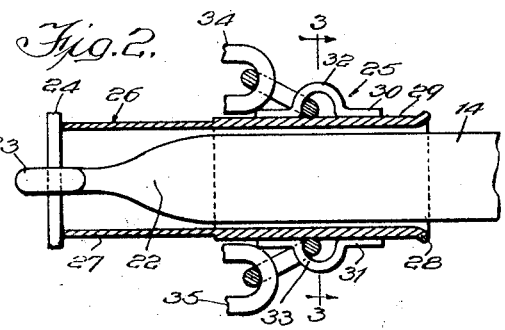
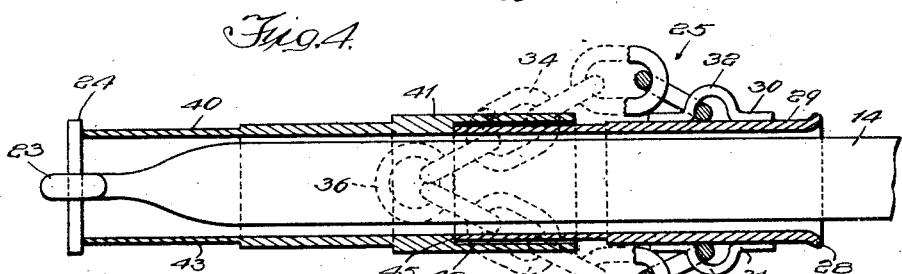
Witness:
William P. Kilroy
Inventor:
Henry L. Parker Patented Aug. 7, 1928.

1,679,490

UNITED STATES PATENT OFFICE.

HENRY L. PARKER, OF CHICAGO, ILLINOIS.

CABLE-PULLING DEVICE.

Application filed December 18, 1926. Serial No. 155,567.

My invention relates to cable pulling apparatus, and more particularly to a pulling device especially adapted for pulling cable ends into manholes or the like, preparatory to the splicing operation.

It has been the practice in conduit work to fasten the pulling strand or chain to an eye portion connected to the end of the cable. Now in a manhole where the space is usually limited, it is exceedingly difficult to pull enough of the cable into the manhole for the splice. Obviously, when the pulling chain is fastened to the end of the cable, it is not feasible to pull the cable end from the conduit across the entire width of the manhole due to the fact that the opening leading to the manhole is usually considerably smaller in diameter than that of the manhole. That is to say, the extent to which the cable end may be pulled from the conduit is generally limited to the diameter of the opening at the top of the manhole. I propose to provide a cable pulling device, the operation of which is entirely independent of the diameter of the opening at the top of the manhole. Through my invention it is possible to pull the cable end from the conduit clear across the entire width or diameter of the manhole. Furthermore, by allowing the end of the cable to sag slightly it is possible, with my novel construction, to pull a length of cable from the conduit exceeding the diameter of the manhole, as will be more fully explained in connection with the detailed description to hereinafter follow. Thus it will be evident that my novel device greatly facilitates the work of the cable splicer.

In accordance with the general features of my invention, I provide a telescoping sleeve construction insertable in the end of the conduit and adapted to receive the associated end of the cable to be pulled. The external end of the sleeve construction when in use abuts a pin extending through the eye portion connected to the end of the cable. The sleeve construction is adapted through this pin to apply a tensive force to the cable end. The cable pulling strand or chain extends into the conduit alongside of the sleeve construction and is fastened to a portion of the sleeve construction inside of the conduit. This arrangement results in the sleeve construction being subjected to a compressive force, which force in turn places the end of the cable under tension.

In accordance with other features of my invention, I preferably make the sleeve construction of a plurality of abutting and telescoping sleeve sections including a main section and a plurality of interchangeable sections. The main section has fastened thereto metallic straps for enabling it to be connected to the pulling chain. This section is adapted to be used independently of the other sections and may be used by itself to enable the cable to be pulled from the conduit whenever only a slight length of cable is needed for the splice. The interchangeable sections include telescoping portions and are adapted to be placed under compression by the main section.

Other objects and advantages of my invention will more fully appear from the following detailed description taken in connection with the accompanying drawing, which illustrates one embodiment thereof and, in which:

Figure 1 is a more or less diagrammatic view illustrating my invention as being used to pull a cable from a conduit into a manhole;

Figure 2 is an enlarged cross sectional view of the principal or main section of my novel sleeve construction.

Figure 3 is a sectional view taken on the line 3—3 of Figure 2 looking in the direction indicated by the arrows; and Figure 4 is an enlarged sectional view of my novel sleeve construction illustrating the manner in which the main section telescopes an auxiliary sleeve section connected to the end of the cable.

Referring now to the drawing in detail, in which like reference numerals designate similar parts throughout the several views, 10 denotes generally a manhole, 11 the manhole opening, and 12 the conduit leading into the manhole. The manhole opening 11 is disposed at the top of the manhole 10 and has a diameter substantially smaller than that of the manhole. This opening 11 is adapted to be normally closed by any suitable cover or closure member, not shown.

Positioned in the conduit 12 is a cable 14 the end of which is to be pulled into the manhole 10 and to be spliced to another cable end (not shown). Extending through the opening 11 and down into the manhole 10 is a vertical hoist member 15 which carries a pair of spaced pulleys 16 and 17, the pulley 16 being disposed above the ground 18, and the pulley 17 being located in the manhole 10 immediately above the axis of the cable 14. A pulling or feeding chain 20 extends downwardly over the pulley 16 and around the pulley 17 towards the conduit 12. The lower end of this chain 20 is adapted to be connected to my novel cable pulling construction to be hereinafter described in detail. The upper end of this chain 20 may be connected to any suitable pulling mechanism, such for example, as a capstan, or the like. I shall now proceed to describe in detail my novel cable pulling construction.

In Figure 2 I have illustrated the cable end as being reduced at 22 and provided with an eye portion 23 at its extremity. Extending through the opening of the eye portion 23 is a small pin or rod 24 which is adapted to abut my novel sleeve construction designated generally by the reference character 25. Now this sleeve construction 25 may be made up of one or more sections, depending upon the length of cable to be pulled into the manhole 10 for the splice. If only a relatively short length of cable is needed in the manhole 10, it will be only necessary to employ my main novel sleeve section designated generally by the reference character 26. When only this main section is employed, its end will abut the pin 24, as shown in Figure 2.

The main sleeve 26 preferably comprises a tubular member provided with a reduced end 27. The end of this sleeve opposite to that associated with the pin 24 is flared as indicated at 28. By flaring the end of the sleeve it is possible to prevent the sleeve from any way marring or injuring the periphery of the cable 14. Also, the flared end 28 enables the sleeve to be moved on to the cable 14 with facility. Fastened to the enlarged end 29 of the main sleeve 26 are a pair of metallic straps 30 and 31. These straps are disposed diametrically opposite each other. The strap 30 includes a loop portion 32, and the strap 31 includes a loop portion 33. A link chain 34 connects the loop portion 32 of the strap 30 with a ring member 36 (Figure 4), and a chain 35 connects the loop portion 33 of the strap 31 to this ring member 36. That is to say, the ring 36 is common to both chains 34 and 35. The end of the pulling strand or chain 20 is adapted to be fastened to this common ring member 36.

The main sleeve 26 may be made of any suitable metallic tubing and is adapted to be placed upon the market as a separate article of manufacture. Also, I desire it understood that although I have described specifically the particular manner in which the end of the pulling chain 20 is anchored to the sleeve 26, the invention is not to be thus limited for obviously any other suitable connecting means may be employed without deviating from the essential features of my invention.

Now should it be desired to pull a relatively great length of cable into the manhole 10, one or more sleeves designated generally by the reference character 40 (Figure 4), may be positioned intermediate the reduced end 27 of the main sleeve 26 and the pin 24. In Figure 4, for purposes of simplicity, I have illustrated only one of these sleeves 40 as being positioned between the main sleeve 26 and the pin 24. The auxiliary sleeves 40 are all identical in construction and hence it is believed that a description of one will suffice for all of them. The auxiliary sleeve is preferably made slightly longer than the main sleeve as shown on the drawing. Each of the sleeves 40 includes an enlarged end 41 having an enlarged opening 42 adapted to receive the reduced end 27 of the main sleeve 26. The sleeve 40 is also provided with a reduced end 43 which has substantially the same diameter as the reduced end 27 of the main sleeve 26. Now where a plurality of main sleeve 26. Now where a plurality of the sleeves 40 are employed, the reduced ends of certain of the sleeves 40 will telescope the enlarged ends of the adjacent sleeves. That is to say, if an additional sleeve 40 was positioned between the sleeve 40 in Figure 4 and the pin 24, its enlarged end 41 would be telescoped by the reduced end 43 of the sleeve shown in Figure 4. The reduced end of the sleeve inside of the enlarged end 41 of the sleeve 40 is adapted to abut the shoulder 45 formed in the sleeve 40. Thus it will be evident that my sleeve construction 25 may be made of variable lengths depending upon the length of cable which is to be pulled into the manhole 10.

The operation of my novel cable pulling apparatus is briefly as follows. Initially, the hoist element 15 is located in the manhole 10 and the lower end of the chain 20 is connected to the chains 34 and 35 of the main sleeve section 26. The sleeve 26 is then slid endwise on the end of the cable 14 into the conduit 12 (Figure 1). As previously pointed out, if only a short length of cable is to be pulled into the manhole 10 the sleeve 26 is disposed with its reduced end abutting the pin 24 inserted in the eye portion 23 of the cable end 22. Now, obviously, upon the application of force to the chain 20 the main sleeve 26 will be pulled forwardly out of the conduit 12. This results in the sleeve 26 being subjected to compression and through the pin 24 causes the end of the cable 14 to be subjected to tension. The cable 14 can thus be pulled very easily out of the conduit 12 into the manhole 10.

Now if a relatively great length of cable is to be pulled in the manhole 10, a plurality of sections or sleeves 40 may be positioned between the main sleeve section 26 and the pin 24. These auxiliary sleeve sections 40 are slid onto the cable in succession immediately after the sleeve 26. Thereafter, the pin 24 is inserted in the eye 23 and the sleeves are moved into a telescoping relationship. That is to say, the ends of the sleeves are moved so that they will telescope the enlarged ends 41 of the sleeves.

Upon the application of force to the main sleeve section 26 through the chain 20, the other sections 40 will be subjected to a compressive force. This results in the end of the cable being subjected to a tensive force through the pin 24. Also, as shown in Figure 1, the end of the cable can be pulled past the hoist element 15 due to the fact that the chain or strand 20 is not connected directly to the end of the cable. Also, the length of the cable pulled into the manhole 10 is not dependent upon the diameter of the manhole opening 11. In fact, it is possible to pull into the manhole 10 a length of cable having a longitudinal dimension greater than the diameter of the manhole 10. This is possible only by causing the cable and the associated sleeve construction to sag downwardly as shown in Figure 1. By letting the end of the cable and the associated sleeve construction touch the bottom of the manhole 10 the cable end is pulled diagonally from the conduit 12. In other words a diagonal strip of cable will be disposed in the manhole 10 upon the completion of the pulling operation. This strip of cable obviously will be of a greater length than the diameter of the manhole 10. After the pulling operation is completed the pin 24 is removed and the sleeve construction is slid off the extending end of the cable 14.

Now I desire it understood that although I have illustrated and described in detail the preferred form of my invention, the invention is not to be thus limited but only in so far as defined by the scope and spirit of the appended claims.

I claim:—

1. In an apparatus for pulling a cable through a conduit, a plurality of abutting sleeves disposed in the conduit and surrounding an end of the cable to be pulled, the sleeve covering the extreme end of the cable being connected thereto, and means for pulling the cable through the conduit connected to one of the other sleeves inside of the conduit.

2. In an apparatus for pulling a cable through a conduit, a series of telescoping sleeves surrounding an end of the cable to be pulled, the sleeve at one end of the series being connected to the extreme end of the cable, and the sleeve at the other end of the series being arranged to exert a compressive force on the other sleeves.

3. In an apparatus for pulling a cable through a conduit, a series of telescoping sleeves surrounding an end of the cable to be pulled, the sleeve at one end of the series being connected to the extreme end of the cable and the sleeve at the other end of the series being arranged to exert a compressive force on the other sleeves, and means including a flexible strand fastened to said latter sleeve inside of the conduit for subjecting said sleeve to a pull in a direction toward said first sleeve.

4. In an apparatus for pulling a flexible cable through a conduit, an integral tubular sleeve insertable in one end of the conduit and embracing an end of the cable, means for connecting the external end of the sleeve to said end of the cable, said means comprising a transverse pin extending through the end of the cable and resting against the end of the sleeve, and flexible pulling means connected to a portion of the sleeve inside of the conduit.

5. In combination, a flexible cable having a pulling eye on its end, an integral sleeve embracing the cable back of said eye, a cross pin passing through the eye and extending across the adjacent end of the sleeve, and flexible tension elements attached to the sleeve at its rear end.

6. A cable pulling device comprising a tubular sleeve member, a flexible pulling yoke attached to the rear end of said sleeve, said sleeve member extending forward beyond the flexible pulling yoke and comprising a plurality of removable sections.

7. A cable pulling device comprising a unitary tubular sleeve having its rear inner peripheral edge rounded out, a pair of eyes connected to the sides of the sleeve, and a flexible yoke having its ends connected to said eyes, said yoke being adapted to lie at one side of said sleeve when the cable is being pulled.

8. The combination of a manhole having a conduit opening thereinto, a flexible electric cable lying in said conduit, pulling means comprising a pulling cable and a pulley over which the pulling cable is trained, said pulley being disposed in said manhole, a tubular pulling device embracing the electric cable and having its forward end attached to the forward end of the cable, and a flexible hitch attached to the rear end of the device and connected to the pulling cable, said tubular device being longer than the length of pulling cable running from the pulley to the flexible hitch.

In witness whereof, I hereunto subscribe my name this 13th day of December, 1926.

HENRY L. PARKER.